July 20, 1965    L. C. MORTON    3,195,932
TUBULAR MEMBER FOR FLEXIBLE WALL JOINT
Filed March 26, 1962
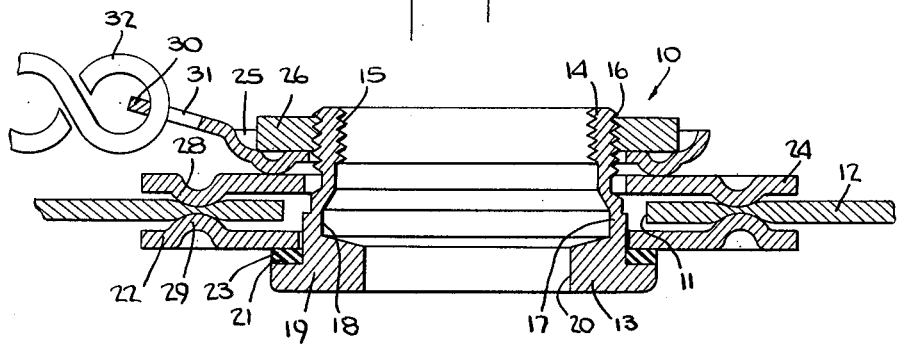
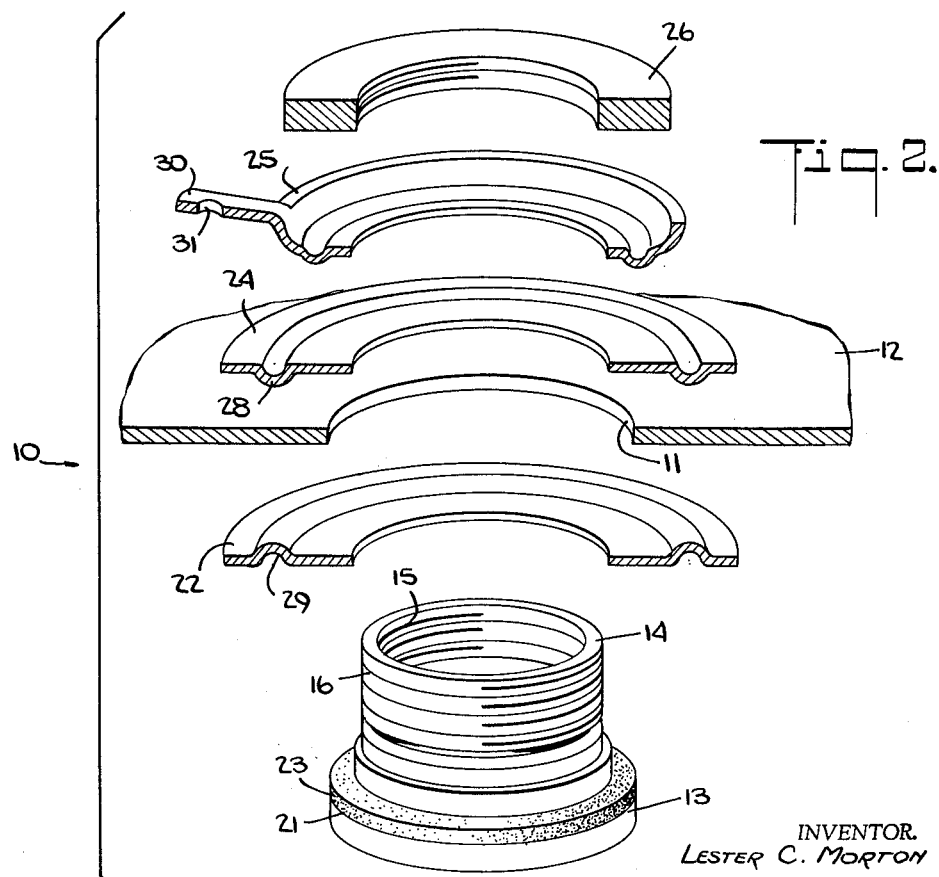
INVENTOR.
LESTER C. MORTON
BY
ATTORNEYS

United States Patent Office

3,195,932
Patented July 20, 1965

3,195,932
TUBULAR MEMBER FOR FLEXIBLE WALL JOINT
Lester Clifford Morton, Dunmurry, Northern Ireland, assignor to National Distillers and Chemical Corporation, Richmond, Va., a corporation of Virginia
Filed Mar. 26, 1962, Ser. No. 182,589
1 Claim. (Cl. 285—200)

This invention relates to a fitting for mounting a valve in an opening in a dunnage air mattress or the like.

Dunnage air mattresses are inflated bags which are placed in freight cars and other carriers to fill up unused space and thereby prevent the freight from shifting and being damaged during shipping. By virtue of the inflation, the mattresses are resilient and therefore can provide a cushion for the freight whenever shock loading is applied to the freight car. The mattress material must be capable of retaining air pressure over a long period of time and also have sufficient strength and resistance to abrasion and puncture so that the mattress will not be damaged during normal usage. The mattresses are commonly provided with a fitting which is secured in an opening in the wall of the mattress. A valve device is mounted in the fitting for the purpose of inflating, or deflating the mattress.

Dunnage mattresses have commonly been fabricated from rubber fabric since it is well suited for the retention of compressed air while at the same time has appreciable strength and resistance to abrasion. For use with rubber fabric mattresses, the valve fitting has been commonly provided with a rubber insert surrounding it which can be readily attached about the opening in the mattress by various cementing or rubber vulcanizing operations. Securing the fitting by cementing or curing the insert to the material of the mattress has been satisfactory whenever the mattress was of the rubber fabric type. In many cases however, dunnage mattresses are fabricated from plastic and other synthetic materials because in many applications these materials have superior resistance to oil and other chemicals compared with rubber fabric. In employing synthetic material for the mattress, the attaching of the insert surrounding the fitting to the mattress has presented a problem since, in many cases, a permanent bond to the plastic material cannot be made by a simple cementing or curing operation.

It is an object of this invention to provide a fitting which can be secured to a dunnage mattress or the like by mechanical engagements therewith in order to provide a strong fluid tight seal.

It is a further object of this invention to provide a fitting for the opening in a dunnage mattress which is retained in place by a clamping action.

It is still a further object of this invention to provide a fitting for a dunnage mattress which can be readily installed in the mattress opening and adjusted to clamp the mattress in order to produce a strong fluid tight seal.

Other objects and further features of this invention will become apparent from the following specification and the accompanying drawings wherein:

FIG. 1 is a vertical section view of the fitting.

FIG. 2 is an exploded perspective view of the fitting.

Briefly, the primary embodiment of the combination of this invention comprises a fitting adapted for insertion into an aperture in the wall portion of a housing. The fitting comprises a body member having an opening extending therethrough with a lower ring member disposed about the body member adjacent the lower end of the opening. An upper ring member is disposed about the body member and substantially overlies and is adjacent to the lower ring member. The adjacent surfaces of the ring members each have a ridge portion disposed in a substantially mating relation. The ring members are adapted to receive the wall portion of the housing adjacent to the aperture between the ridge portions in their operative position. The fitting also includes means for clamping the ring members toward each other. In this way the fitting is sealed with respect to the wall portion of the housing.

Another embodiment of the combination of this invention comprises means for sealing at least one of the upper and lower ring members to the body member so that the pressured fluid cannot escape between the fitting and the aperture in the wall portion of the housing.

In another embodiment of this invention the adjacent faces of the upper and lower washers are conditioned to have an increased coefficient of friction when engaged with the wall of the housing.

In still another embodiment of the invention, means are provided for securing the lower washer to the body member of the fitting so that it remains in place prior to and during assembly.

Referring to FIGS. 1 and 2, fitting 10 is adapted for insertion into an aperture or opening 11 in wall portion 12 of a housing or the like, such as a dunnage mattress. The central body member of the fitting is valve body 13 which is of a substantially cylindrical form. The upper portion 14 of valve body 13 contains internal threads 15 and external threads 16. Middle portion 17 of the valve body includes an enlarged chamber portion 18 while bottom portion 19 of the valve body includes cylindrical seat 20.

Valve body 13 is adapted to receive a check valve such as that set forth in the copending application of Lester C. Morton, Ser. No. 89,751 filed February 16, 1961, now Patent No. 3,147,763. Such a check valve is initially partially engaged with internal threads 15 so that pressurized gas during the charging of the dunnage mattress may flow through enlarged chamber 18 and along cylindrical seat 20 into the interior of the mattress. When the mattress has been sufficiently inflated, the check valve is rotated until it is fully engaged with internal threads 15 at which position it effects a seal along cylindrical seat 20.

About the periphery of bottom portion 19 of the valve body, there is provided external shoulder portion 21 which is adapted to receive and restrain lower washer 22. In order to prevent any leakage between the valve body and the internal diameter of lower washer 22, sealing washer 23 can be installed between the lower face of lower washer 22 and external shoulder portion 21.

With lower washer 22 adjacent bottom portion 19 the valve body is inserted through opening 11 in wall portion 12 of the dunnage mattress, until the upper surface of lower washer 22 contacts wall portion 12. At this point middle portion 17 of the valve body is substantially in alignment with the opening in the wall portion of the dunnage mattress. Upper washer 24 fits around valve body 13 and is adapted to engage wall portion 12 of the dunnage mattress along the lower surface of the washer.

To complete the assembly of the fitting, washer 25 is placed about valve body 13 and nut 26 is then engaged with external threads 16. Nut 26 having wrench flats 27 is tightened downwardly upon washer 25 and compresses upper and lower washers, 24 and 22 respectively, against wall portion 22 of the dunnage mattress which is disposed between the washers. To produce a tight seal between the washers and the wall portion, the adjacent surfaces of the upper and lower washers are provided with ridge portions, 28 and 29 respectively. The ridge portions of the washers are disposed in a substantially mating arrangement so that as nut 26 is tightened, the ridge portions are forced toward one another and apply a compressive force to the wall portion adjacent to them.

Since the wall portion is fabricated from a resilient material, the material is compressed inwardly between the ridge portions and a fluid seal is established. At the same time, the vise-like action of the ridge portions provides a strong engagement of the washers to the wall portion so that the wall portion cannot be slipped or pulled between the washers during normal usage of the dunnage mattress. The ridge portions can be of a substantially semi-circular cross section so that there are no sharp edges which can cut or puncture the wall portion as the washers are tightened together. The tightening of nut 26 compresses lower washer 22 against sealing washer 21 so that any possible path of leakage between the lower washer and valve body 13 is blocked. Since sealing has been made at both the ridge portions and at sealing washer 21, no possible leakage can occur from the dunnage mattress about the opening once the check valve or other closure device has been installed within the interior of fitting 10.

Since some plastic materials have a wax-like or greasy surface and others an extremely smooth surface, the adjacent surfaces of upper and lower washers, 24 and 22 respectively, can be abraded by sand blasting or the like in order to increase the coefficient of friction between the washers and the wall portion of the dunnage mattress. Once the nut is tightened, the increased friction due to the roughened surfaces will prevent any tendency for wall portion 12 to slip from engagement between ridge portions 28 and 29.

Washer 25 disposed between upper washer 24 and nut 26 can be provided with ear 30 having opening 21 to receive hook 32 which is connected to the check valve or other closure device (not shown) for the fitting.

From the above description, it is evident that the fitting can be readily employed with openings in housings or the like similar in nature to a dunnage mattress. These include rubber boats, pneumatic pontons, pressurized rubber rollers, fuel cells, and other containers fabricated from various pastic materials and requiring fittings within openings for the installation of valves and the like.

The present invention may be embodied in other specific forms not described herein without departing from the spirit and essential attributes thereof. It is therefore desired that the present embodiments be considered illustrative and not necessarily restrictive.

What is claimed is:

A fluid control valve body fitting adapted for insertion into an aperture in the wall portion of a container made of resilient material or the like comprising a tubular body member having an external shoulder portion adjacent the lower end portion thereof, a lower washer slideably engaged with said shoulder portion, an upper washer slideably disposed about the periphery of said body member, said upper washer substantially overlying and being adjacent said lower washer, the adjacent faces of said washers having respective opposed ridge portions disposed in substantially mating relation, said washers being adapted to receive the wall portion of said housing adjacent said aperture between said ridge portions in their operative position, and means for clamping said washers toward each other including a third washer overlying said upper washer having a downwardly facing circular ridge portion of substantially lesser diameter than that of the other said ridge portions bearing against said upper washer and means engageable with said tubular body and overlying said third washer for urging the ridge portion of said third washer against said upper washer, whereby said fitting is adapted to be sealed with respect to said wall portion, and further comprising means for sealing said lower washer against said shoulder portion.

References Cited by the Examiner

UNITED STATES PATENTS

| | | | |
|---|---|---|---|
| 151,803 | 6/74 | Spinning | 285—206 |
| 2,117,111 | 5/38 | Bills | 285—206 |
| 2,137,313 | 11/38 | Tingle | 285—349 X |
| 2,244,427 | 6/41 | Miller | 285—202 X |
| 2,427,477 | 9/47 | Shapiro | 285—200 |
| 2,763,960 | 9/56 | Wintriss | 285—205 X |

FOREIGN PATENTS

| | | |
|---|---|---|
| 1,201,350 | 7/59 | France. |
| 566,954 | 1/45 | Great Britain. |

CARL W. TOMLIN, *Primary Examiner.*